US007996878B1

(12) United States Patent  
Basso et al.

(10) Patent No.: US 7,996,878 B1  
(45) Date of Patent: Aug. 9, 2011

(54) SYSTEM AND METHOD FOR GENERATING CODED VIDEO SEQUENCES FROM STILL MEDIA

(75) Inventors: Andrea Basso, Monmouth, NJ (US); Eric Cosatto, Highlands, NJ (US); Steven Lloyd Greenspan, Scotch Plains, NJ (US); David M. Weimer, Aberdeen, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1137 days.

(21) Appl. No.: 09/650,355

(22) Filed: Aug. 29, 2000

Related U.S. Application Data

(60) Provisional application No. 60/151,543, filed on Aug. 31, 1999.

(51) Int. Cl.
*H04N 7/10* (2006.01)
*H04N 7/16* (2006.01)
*G06F 3/00* (2006.01)

(52) U.S. Cl. .............. 725/135; 725/23; 725/32; 725/34; 725/35; 725/36; 725/46; 715/723

(58) Field of Classification Search .............. 725/46, 725/135, 47, 32, 34–36, 42; 345/722, 723; 715/723
See application file for complete search history.

(56) References Cited

U.S. PATENT DOCUMENTS

| | | | | |
|---|---|---|---|---|
| 5,086,385 A | * | 2/1992 | Launey et al. ................... | 700/83 |
| 5,267,034 A | | 11/1993 | Miyatake et al. | |
| 5,404,316 A | * | 4/1995 | Klingler et al. ............... | 715/723 |
| 5,517,605 A | * | 5/1996 | Wolf ........................... | 707/104.1 |
| 5,598,208 A | * | 1/1997 | McClintock .................. | 348/159 |
| 5,664,227 A | * | 9/1997 | Mauldin et al. ............... | 715/203 |
| 5,703,995 A | * | 12/1997 | Willbanks ....................... | 386/52 |
| 5,714,997 A | * | 2/1998 | Anderson ....................... | 348/39 |
| 5,736,977 A | * | 4/1998 | Hughes .......................... | 345/716 |
| 5,757,418 A | * | 5/1998 | Inagaki ...................... | 348/14.07 |
| 5,805,733 A | * | 9/1998 | Wang et al. ................... | 382/232 |
| 5,812,736 A | | 9/1998 | Anderson | |
| 5,818,439 A | * | 10/1998 | Nagasaka et al. ............... | 725/87 |
| 5,831,664 A | * | 11/1998 | Wharton et al. ............... | 725/81 |
| 5,835,667 A | | 11/1998 | Wactlar et al. | |
| 5,850,352 A | * | 12/1998 | Moezzi et al. ............... | 345/419 |
| 5,892,535 A | | 4/1999 | Allen et al. | |

(Continued)

*Primary Examiner* — Son P Huynh (57) ABSTRACT

The invention provides a system and method that transforms a set of still/motion media (i.e., a series of related or unrelated still frames, web-pages rendered as images, or video clips) or other multimedia, into a video stream that is suitable for delivery over a display medium, such as TV, cable TV, computer displays, wireless display devices, etc. The video data stream may be presented and displayed in real time or stored and later presented through a set-top box, for example. Because these media are transformed into coded video streams (e.g. MPEG-2, MPEG-4, etc.), a user can watch them on a display screen without the need to connect to the Internet through a service provider. The user may request and interact with the desired media through a simple telephone interface, for example. Moreover, several wireless and cable-based services can be developed on the top of this system. In one possible embodiment, the system for generating a coded video sequence may include an input unit that receives the multimedia input and extracts image data, and derives the virtual camera scripts and coding hints from the image data, a video sequence generator that generates a video sequence based on the extracted image data and the derived virtual camera scripts and coding hints, and a video encoder that encodes the generated video sequence using the coding hints and outputs the coded video sequence to an output device. The system may also provide customized video sequence generation services to subscribers.

27 Claims, 4 Drawing Sheets

U.S. PATENT DOCUMENTS

| | | | |
|---|---|---|---|
| 5,900,953 | A | 5/1999 | Bottou et al. ............... 358/540 |
| 5,956,026 | A * | 9/1999 | Ratakonda ................. 715/723 |
| 5,963,203 | A * | 10/1999 | Goldberg et al. ............. 715/723 |
| 5,986,668 | A * | 11/1999 | Szeliski et al. .............. 345/634 |
| 6,006,241 | A * | 12/1999 | Purnaveja et al. ............ 715/205 |
| 6,006,257 | A * | 12/1999 | Slezak ........................ 725/110 |
| 6,006,265 | A * | 12/1999 | Rangan et al. ............... 709/226 |
| 6,029,045 | A * | 2/2000 | Picco et al. .................... 725/34 |
| 6,052,492 | A * | 4/2000 | Bruckhaus .................. 382/284 |
| 6,138,147 | A * | 10/2000 | Weaver et al. ............... 709/206 |
| 6,139,197 | A * | 10/2000 | Banks .......................... 709/217 |
| 6,144,375 | A * | 11/2000 | Jain et al. .................... 715/251 |
| 6,177,931 | B1 * | 1/2001 | Alexander et al. ........... 725/52 |
| 6,188,398 | B1 * | 2/2001 | Collins-Rector et al. ...... 725/37 |
| 6,195,497 | B1 | 2/2001 | Nagasaka et al. |
| 6,211,869 | B1 * | 4/2001 | Loveman et al. ............ 715/723 |
| 6,216,129 | B1 * | 4/2001 | Eldering ..................... 705/36 R |
| 6,223,190 | B1 * | 4/2001 | Aihara et al. ............... 715/234 |
| 6,236,395 | B1 * | 5/2001 | Sezan et al. ................. 345/723 |
| 6,266,068 | B1 | 7/2001 | Kang et al. |
| 6,282,713 | B1 * | 8/2001 | Kitsukawa et al. ........... 725/36 |
| 6,307,550 | B1 * | 10/2001 | Chen et al. .................. 345/418 |
| 6,330,004 | B1 * | 12/2001 | Matsuzawa et al. ......... 715/723 |
| 6,360,234 | B2 * | 3/2002 | Jain et al. .................... 715/201 |
| 6,369,835 | B1 | 4/2002 | Lin |
| 6,377,294 | B2 * | 4/2002 | Toyofuku et al. ............ 348/36 |
| 6,380,950 | B1 * | 4/2002 | Montgomery et al. ....... 715/723 |
| 6,405,175 | B1 * | 6/2002 | Ng ................................ 705/14 |
| 6,442,538 | B1 * | 8/2002 | Nojima ......................... 707/1 |
| 6,446,261 | B1 | 9/2002 | Rosser |
| 6,449,608 | B1 * | 9/2002 | Morita et al. ................. 707/3 |
| 6,463,585 | B1 * | 10/2002 | Hendricks et al. ............ 725/35 |
| 6,466,275 | B1 * | 10/2002 | Honey et al. ................. 348/722 |
| 6,470,378 | B1 * | 10/2002 | Tracton et al. ............... 709/203 |
| 6,496,981 | B1 | 12/2002 | Wistendahl et al. |
| 6,505,169 | B1 * | 1/2003 | Bhagavath et al. ........ 705/14.66 |
| 6,507,872 | B1 * | 1/2003 | Geshwind ................... 709/236 |
| 6,516,090 | B1 * | 2/2003 | Lennon et al. ............... 382/173 |
| 6,553,178 | B2 * | 4/2003 | Abecassis ..................... 386/83 |
| 6,567,980 | B1 * | 5/2003 | Jain et al. ...................... 725/61 |
| 6,571,054 | B1 * | 5/2003 | Tonomura et al. ........... 386/95 |
| 6,573,907 | B1 * | 6/2003 | Madrane ...................... 715/719 |
| 6,578,011 | B1 * | 6/2003 | Forward ........................ 705/14 |
| 6,584,463 | B2 * | 6/2003 | Morita et al. .................. 707/3 |
| 6,597,861 | B1 | 7/2003 | Tozaki et al. |
| 6,602,297 | B1 * | 8/2003 | Song ............................ 715/210 |
| 6,608,930 | B1 * | 8/2003 | Agnihotri et al. ............ 382/176 |
| 6,609,658 | B1 * | 8/2003 | Sehr .............................. 235/384 |
| 6,628,303 | B1 * | 9/2003 | Foreman et al. ............. 715/723 |
| 6,631,522 | B1 * | 10/2003 | Erdelyi ......................... 725/53 |
| 6,665,003 | B1 * | 12/2003 | Peleg et al. ................... 348/36 |
| 6,677,981 | B1 * | 1/2004 | Mancuso et al. ............. 348/36 |
| 6,698,020 | B1 * | 2/2004 | Zigmond et al. ............. 725/34 |
| 6,710,785 | B1 * | 3/2004 | Asai et al. .................... 715/723 |
| 6,711,741 | B2 * | 3/2004 | Yeo ............................... 725/87 |
| 6,718,551 | B1 * | 4/2004 | Swix et al. .................... 725/32 |
| 6,738,075 | B1 | 5/2004 | Torres et al. |
| 6,766,524 | B1 * | 7/2004 | Matheny et al. .............. 725/23 |
| 6,769,127 | B1 * | 7/2004 | Bonomi et al. ............... 725/39 |
| 6,774,926 | B1 * | 8/2004 | Ellis et al. .................. 348/14.01 |
| 6,782,550 | B1 * | 8/2004 | Cao ............................... 725/39 |
| 6,789,228 | B1 | 9/2004 | Merril et al. |
| 6,799,326 | B2 * | 9/2004 | Boylan et al. ................ 725/35 |
| 6,820,277 | B1 * | 11/2004 | Eldering et al. .............. 725/35 |
| 6,877,134 | B1 * | 4/2005 | Fuller et al. ................. 715/202 |
| 6,882,793 | B1 * | 4/2005 | Fu et al. ........................ 386/95 |
| 7,043,048 | B1 * | 5/2006 | Ellingson .................... 382/100 |
| 7,079,176 | B1 * | 7/2006 | Freeman et al. ........... 348/207.1 |
| 7,114,174 | B1 * | 9/2006 | Brooks et al. ............... 725/105 |
| 7,313,808 | B1 * | 12/2007 | Gupta et al. .................. 725/89 |
| 2001/0018693 | A1 * | 8/2001 | Jain et al. ..................... 707/500 |
| 2001/0028399 | A1 * | 10/2001 | Conley ......................... 348/239 |
| 2001/0049701 | A1 * | 12/2001 | Howerton et al. ............ 707/513 |
| 2002/0103697 | A1 * | 8/2002 | Lockhart et al. ............. 705/14 |
| 2002/0116256 | A1 * | 8/2002 | De Rafael et al. ............ 705/14 |
| 2005/0149964 | A1 * | 7/2005 | Thomas et al. ............... 725/9 |
| 2005/0262542 | A1 * | 11/2005 | DeWeese et al. ............ 725/106 |
| 2006/0064641 | A1 | 3/2006 | Montgomery et al. |

* cited by examiner

| Matthew and Megan Subscriber 400 | | | ID# 123-456-7890 | |
|---|---|---|---|---|
| 410 | 420 | 430 | 440 | |
| Format settings | Coding preferences | Special Handicap Settings | Addresses/URLs of pictures | .. |

Fig. 4

SYSTEM AND METHOD FOR GENERATING CODED VIDEO SEQUENCES FROM STILL MEDIA

This non-provisional application claims the benefit of U.S. Provisional Patent Application No. 60/151,543, filed Aug. 31, 1999, and incorporated herein by reference in its entirety.

TECHNICAL FIELD

The invention relates to generating coded video sequences suitable for presentation and display, from any media (still or motion pictures) in compressed or uncompressed format, such as series of related or unrelated still frames, web-pages, 3D synthetic objects, or short video clips, or any combination thereof.

BACKGROUND OF THE INVENTION

The advent of digital television (TV) and the large deployment of cable and wireless communications have increased the need to process and display multimedia data in variety of formats. For example, TV, computer displays and portable communication devices are ideal devices for the multimedia delivery and presentation of visual information, such as still pictures, panorama images, high resolution medical images, street maps, aerial pictures, etc., to a large number of customers. In particular, TV is a low-resolution device that is suitable for presentation of both analog and digital encoded video and audio.

SUMMARY OF THE INVENTION

The invention provides a system and method that transforms a set of still/motion media (i.e., a series of related or unrelated still frames, web-pages rendered as images, or video clips) or other multimedia, into a video stream that is suitable for delivery over a display medium, such as TV, cable TV, computer displays, wireless display devices, etc. The video data stream may be presented and displayed in real time or stored and later presented through a set-top box, for example. Because these media are transformed into coded video streams (e.g. MPEG-2, MPEG-4, etc.), a user can watch them on a display screen without the need to connect to the Internet through a service provider. The user may request and interact with the desired media through a simple telephone interface, for example. Moreover, several wireless and cable-based services can be developed on the top of this system.

In one possible embodiment, the system for generating a coded video sequence may include an input device that receives the multimedia input and extracts image data, and derives the virtual camera scripts and coding hints from the image data, a video sequence generator that generates a video sequence based on the extracted image data and the derived virtual camera scripts and coding hints, and a video encoder that encodes the generated video sequence using the coding hints and outputs the coded video sequence to an output device. The system may also provide customized video sequence generation services to subscribers.

BRIEF DESCRIPTION OF THE DRAWINGS

The invention is described in detail with reference to the following drawings wherein like numerals reference like elements, and wherein.

DETAILED DESCRIPTION OF THE PREFERRED EMBODIMENTS

Figure 1:
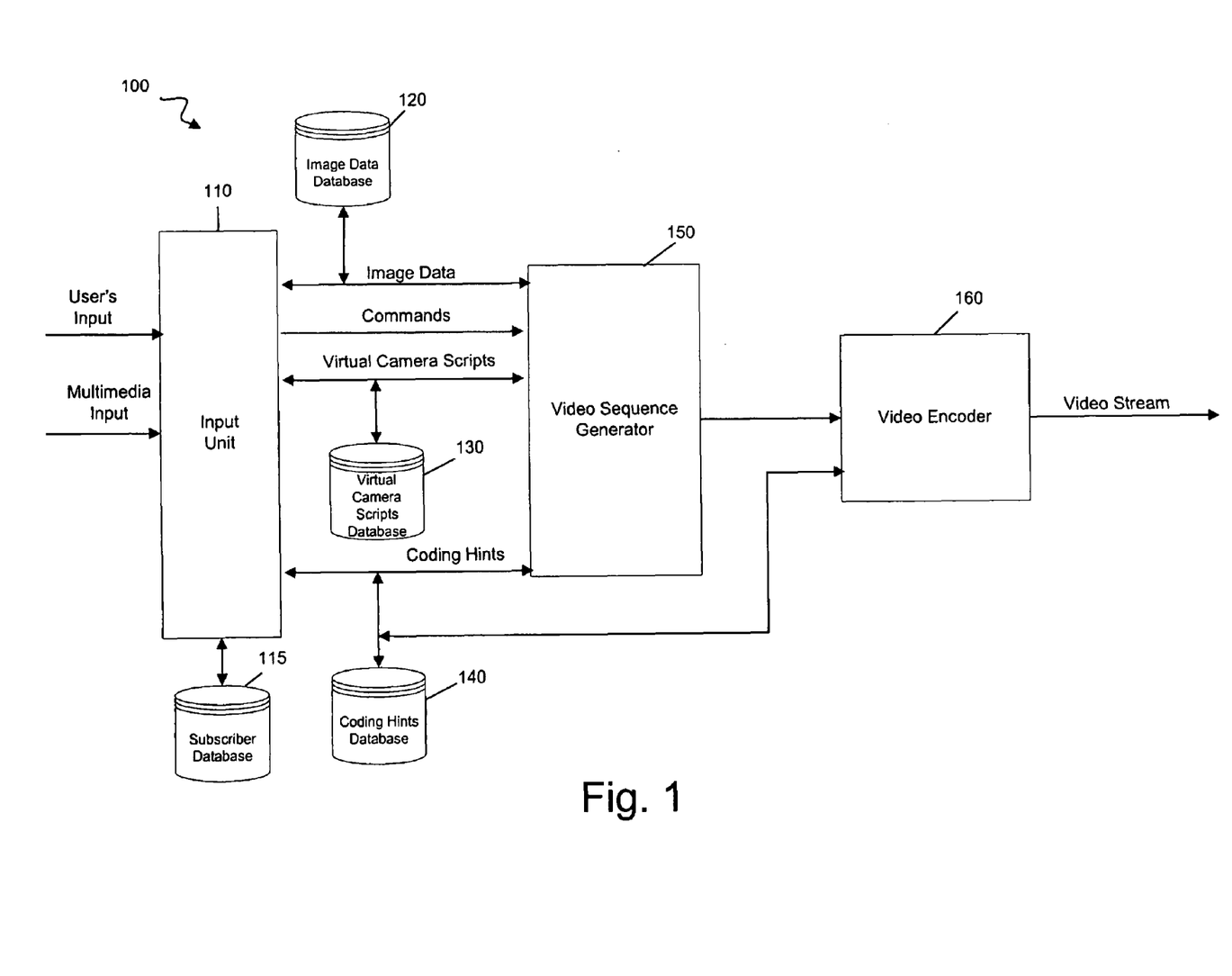
FIG. 1 is a block diagram of an exemplary coded video sequence generating system.

FIG. 1 is an exemplary block diagram of one possible embodiment of a coded video sequence generating system 100. The coded video sequence generating system 100 includes a video sequence generator unit 150 connected to an input unit 110, a subscriber database 115, an image data database 120, a virtual camera scripts database 130, a coding hints database 140, and a video encoder 160.

In one possible embodiment, the input unit 110 receives input multimedia from one or more of a variety of sources including television, cable TV, interactive TV, the Internet or other computer networks, telephone, computer generated images, wireless communications, photographs, electronically stored still images, etc. The input unit 110 may also retrieve images, video clips, etc., or links to stored media, from a user/subscriber profile stored in the subscriber database 115. The input unit 110 then extracts information from the multimedia input, including image data, and in one possible embodiment, derives virtual camera scripts, and coding hints (described in detail below) from the image data. The input unit 110 may extract the image data according to any method known to one skilled in the art, including the AT&T DjVU still coding scheme and the methods described in U.S. Pat. No. 5,900,953, which is incorporated by reference in its entirety.

The virtual camera scripts and the coding hints (examples of which are listed in detail below) may be manually input or derived by a system operator based on the operators knowledge of the image, (i.e., the image contains text, the desired scrolling pattern, etc.), or input based on the operators desired output effect (i.e., different compression techniques for background and foreground, scrolling horizontally or vertically, etc.). Alternatively, the virtual camera scripts and the coding hints may be automatically extracted or derived from the extracted image data or directly from the input multimedia input. To perform this automatic extraction or derivation, any known method or algorithm known to one skilled in the art that can derive the virtual camera scripts and coding hints listed below, may be used within the spirit and scope of the invention.

The input unit 110 may directly input the image data, virtual camera scripts and coding hints to the video sequence generator 150. Alternatively, the input unit 110 may store the image data in the image data database 120, the virtual camera scripts in the virtual camera scripts database 130, and the coding hints in the coding hints database 140. The input unit 110 may also send commands directly to the video sequence generator 150, such as directions concerning the starting and stopping of transactions.

A description and examples of the types and content of image data, virtual camera scripts, and coding hints extracted by the input unit 110, are described below. The image data may include, but should not be limited to, the following:

Large images or pixelmaps, such as high-resolution street maps or aerial images, which are coded in TIFF, GIF, JPEG, etc., format.

A series of related or unrelated still frames or pixelmaps, such as the image components of a panorama image (related), or a series of photographs from a film (unrelated), coded in pixelmap formats TIFF, GIF, JPEG, etc.

Web pages rendered as images in the form of a single image or multiple images.

Single panorama files containing a panoramic view in a specific format appropriate for panorama navigation. File formats may include QuickTime VR, IPIX, etc.

Single files containing vector representation of text and graphics, such as HTML, Postscript, ASCII text, etc.

Short video clips.

Single files containing a vector representation of (synthetically coded) 3D worlds, such as VRML.

Lighffields of single objects. A lightfield is a collection of images of a single object under different viewpoints.

One or more of the above listed image data.

The virtual camera scripts (VCScript) algorithmically describe the operations that the video sequence generator 150 has to execute to transform the input data into the desired image sequence. Note that virtual camera scripts can be nested in the sense that a virtual camera script can include other virtual camera scripts in its body. The virtual camera scripts may include, but are not limited to, the following list of possible transformations.

A sliding window of resolution, comparable to the TV resolution, spans the input data in order to generate a sequence of frames that simulates a camera movement such as panning/tilting/zooming.

Simulating document browsing by page such that consecutive pages do not overlap and access is either sequential or random.

General composition of images or video clips. A set of images or video clips may be juxtaposed with or without transparency.

Special imaging techniques that can be used to synthesize (or simulate) videos from a set of images. One such technique is known as panorama synthesis where several pictures are taken from a single point of view but cover 360° around the camera and are then stitched together to from a panorama picture. Then, using special projection techniques, camera rotation around its axis can be simulated.

Other more elaborate techniques can account for parallax, when camera motion is parallel to the subject being viewed. These techniques provide a better sense of perspective and make the experience more realistic. The techniques include transparency mattes and lightfields.

More general camera motions and object manipulation can be used when viewing objects or worlds represented in 3D.

As an example of a virtual camera script, a simple sequence of 100 frames of TV resolution (640×480 pixels) showing a panning on the original input image corresponds to the following:

Win=window 640 480;
For i=1 to 100
{
Frame[i]=SHIFT 10*i pixels vertically Win
}.

According to this example, the virtual camera script dictates that 100 frames are to be vertically scrolled at a constant vertical velocity. Note that only the vertical motion vector is specified.

Coding hints are provided to the video encoder 160 in order to optimize coding performance. Coding hints reveal the encoding process for each frame as well as define the temporal evolution of each frame. As stated above, the coding hints may be provided by the operator or derived from the image data. The coding hints may be provided by the video encoder 160 or output device based on desired or required coding for the video data stream. In other words, the output device and/or output media may require a particular coding treatment.

The coding hints may also be generated by the video sequence generator 150. Thus, any way the system can determine coding hints that, for example, will specify the frame number in the sequence and the number of frames to which such parameters should be applied in the encoding process, may be used. The relevant information for the previously described transformations are provided in but are not limited to, the list below:

In the case of panning/tilting/zooming, the motion information used to generate the sequences of frames can be passed to the video encoder 160, (which may be typically a Hybrid inter/intra frame encoder) and need not to be computed by the video encoder 160 itself. This process will save cycles in the encoding process as well as improve the coding performances because the motion does need to be estimated since the exact motion values are available.

For composition, coding parameters can be specific to each, as opposed the final, composite image.

In the case of frame repetition, such information will be inserted in the formatted output sequence of frames in a format understandable by the decoder/set-top box.

The above listed image data, virtual camera scripts, and coding hints are purely exemplary in nature and the invention may encompass many other types of data and formats currently existing or developed in the future.

The image data, virtual camera scripts and coding hints for a particular set of multimedia data are, of course, interrelated. For example, a set of stored image data may be associated with the set of virtual camera scripts that need to be applied to it as well as the associated coding hints to optimize the coding performance of the resulting sequence of frames.

The relationship between image data, virtual camera scripts and coding hints can be illustrated by the example below. Let's say that the input media to the system is generally still pictures that may include some video clips. The virtual camera scripts are generated by a human (i.e., having a given picture that scrolls) or by a software used by a human. The input data is a picture 640×480 with some text on it. The operator desires to generate a simple camera script that will generate a scrolling and zooming of the picture itself. Therefore, the system needs to determine how much the image needs to scroll for every frame of the output sequence. This depends on the scrolling speed and other factors (i.e. frame rate etc). An operator can compute all these parameters and input them as a virtual camera script (note that alternatively, a software tool can perform these tasks).

The coding hints in this case are

1. The notion that the picture contains text (thus, the coding parameters should be optimized for text coding).

2. The exact motion that every pixel is known priori. So there is no need to compute it. The coding performance will be optimized because we know the exact pixel motion.

If it was not known that the image had some text, an algorithm that recognizes the presence and location of text in the image, would be desired so that the encoder can do optimize its performance. As discussed above, there are several algorithms that can be used which are beyond the scope of this patent and as such, will not be described here.

The operation of the video sequence generator 150 will now be described. The video sequence generator 150 receives input image data from the image data database 120, virtual camera scripts from the virtual camera scripts database 130, coding hints from the coding hints database 140, and commands from the input unit 110. The video sequence generator 150 rearranges, composes and processes the input image data in order to form a pixel map or a sequence of pixel maps of resolution equal to the TV resolution. These pixel maps can be in coded or non-coded form. This succession of pixel maps represents a video sequence that is then passed to the video encoder 160. The generation of the sequence of video frames starting from the input data image is specified by the virtual camera script as described below.

The image data database 120 contains image data in various formats, as described above. The video sequence generator 150 has to know each of these formats in order to render an image into a pixel map. For each image data format, there has to be a "rendering plug-in" available to decode the appropriate portion of the image data into a pixel-map. Each of these plug-in must offer a basic interface that takes as input specific parameters that enables the rendering plug-in to create a view of the image data. These parameters can be, but are not limited to, camera placement, object placement, document page number, etc.

The role of the video sequence generator 150 is to translate generic commands from the virtual camera script into a list of specific parameters and actions and render the frames accordingly. The virtual camera script can be fed directly to the video sequence generator 150 or can be part of a set of predefined scripts that reside in the virtual camera scripts database 130 or a composition of the two. The proper virtual camera scripts can be chosen on the basis of operator defined profiles and can be related to the nature of the input data.

As an example, the input unit 110 receives a command, such as "PAN over image X". The video sequence generator 150 loads the rendering engine associated to the type of image X. It then loads and executes the VCScript "PAN" which algorithmically describes how to generate a suite of images that simulate a lateral movement of a camera. For each step of the script, the video sequence generator 150 calls the rendering engine with appropriate parameters of the current panning position and obtains in return, the pixel map which is sent over to the video encoder 160. Additionally, the video sequence generator 150 may also generate coding hints for the video encoder 160 to optimize coding performance.

The video encoder 160 may include any encoding device or algorithm known to those skilled in the art. For example, the video encoder 160 may operate on the basis of requests of type:
<String ReqID> <String Control> <Raw Image>

In this request, a given image in raw format (<Raw Image>) is given as input together with high-level description contained in the <String Control> of the action or series of actions that should be performed by the encoding service on the raw image, to generate a sequence of coded frames suitable for display.

The video encoder 160 output will be in the form:
<String ReqID> <MPEG2 sequence>

In this output, the <String ReqID> uniquely identifies the request and the resulting sequence of frames that will be coded in MPEG-2, for example.

The video sequence generator 150 then passes on the processed sequence of images to the video encoder 160 for encoding. The video encoder 160 (e.g., an MPEG encoder) can support a variety of features that are beyond the realm of simple encoding. For example, the video encoder 160 can implement a caching scheme, multicasting, composition of image elements, and composition of streams (e.g., pictures with audio), as well as, facilitate panning for thin TV clients. These features, as described below, can make a significant impact in providing effective user experiences for television-based interpersonal communication services (such as those described in U.S. patent application Ser. No. 09/223,161, filed Dec. 30, 1998, and entitled "Method And Apparatus For Internet Co-Browsing Over Cable Television And Controlled Through Computer Telephony", which is incorporated herein by reference in its entirety), as well as other services, for example.

Caching screens/images that are delivered by various proxies can help improve system performance. The caching process can also be combined with composition mechanisms so that pre-rendered images can be combined with other content. The caching process may rely on the URL to identify images. The request for a URL would be issued first to the video encoder 160 and if in cache, shipped to the destination. Any request that could not be satisfied with elements in the cache would result in a reply that would cause a request to be sent to the proxy responsible for locating and rendering the contents.

Addressing may be a part of the signaling. Any addressing scheme should include the capabilities of multicasting. Multicasting can be implemented as a request where each address can consist of a sequence of destinations, or a special request can be establishes a multicast group with a group address. The group address would cause all subsequent requests to be multicast to every address within the group.

Composition allows content to be delivered from multiple sources, and combined into a single image/stream before delivery to the TV. This feature can provide the following advantages:

- Third parties can rent space on a service, and some portion of the screen could be allocated to them.
- Audio could be combined with picture to form a combined audio-visual stream.
- Web content could be combined with TV or other image sources.
- Interactive events could be depicted on images within the server (e.g., telepointers, highlighting, etc.).

Composition would require a set of signaling conventions that allow images to be treated as parts of a final image. It would also need to include some layout information (e.g., coordinates/dimensions).

Spatial and temporal synchronization will be a critical part of the user's experience. In a 2-way or N-way conversation, the sender of the information should see what the recipients see (spatial synchronization). If there are multiple screens or some manner of scrolling a larger screen remotely, the views should remain consistent throughout the session. If someone is receiving the "pushed" screens in a PC, through a browser, there is less of a likelihood that the displays will remain synchronized.

If supports for multiple output formats are introduced, coded video streams (e.g., MPEG) could be sent to TVs and coded images (e.g., JPEG) could be sent to browser windows. Scrolling, or paging would be provided through a separate interface that would properly signal any changes through a server. Thus, while the PC user points their browser directly to the URL, the use of the same proxy by the TV viewer will insure spatial synchronization and consistent rendering of the screen.

Since this "push" may be the normal mode of operation, the sender will most often wish to view what they wish to send, before they send it. Then, the only issue involved in temporal synchronization is a back channel to signal to the sender that the encoded image has been sent. One other possible example of temporal synchronization is in the use of streams. Web contents could be parsed in a manner that there was a screen rendered, and corresponding text that could be converted to audio using text-to-speech. The video encoder 160 could sequence through the images at a rate that is synchronized with the audio stream. In essence, a web page or web site could be presented as a narrative.

Moreover, since the TV is low-resolution, users may want to have larger pages/images that can be scrolled. Currently most interactive TV applications use paging, not scrolling. The Web, however, is often authored with the expectation of being able to scroll. If the web proxy could deliver TV, and higher resolutions as needed, the video encoder 160 could cache the larger image. Scrolling can simply replace the existing view with one from the new location, or it can be depicted as a smooth scroll series of images.

The above listed encoding processes and encoders are purely exemplary in nature and the invention may encompass many other types of data and formats currently existing or developed in the future. After the encoding process is complete, the video encoder 160 outputs the coded video sequence as a video stream to an output device for viewing by the user.

Furthermore, while for ease of discussion the system and method described herein often refers to TV applications, the invention may be applied to cable TV, interactive TV, the Internet, telephones, portable communication devices, wireless communication devices, computer-generated image devices, etc. without departing from the spirit and scope of the invention.

Figure 2:
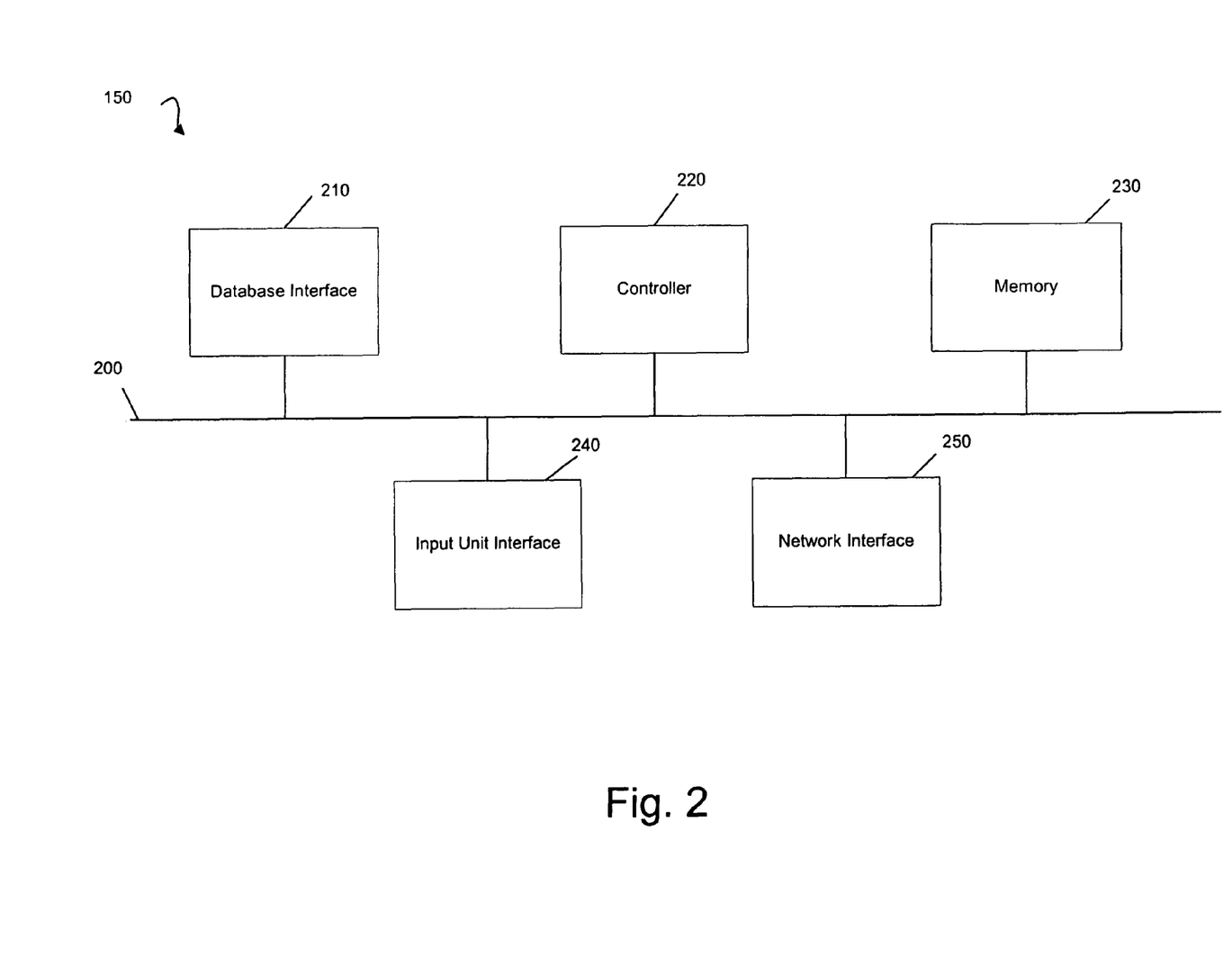
FIG. 2 is a block diagram of an exemplary video sequence generator.

The video sequence generation process will now be described with reference to FIGS. 2 and 3. FIG. 2 is a block diagram of an exemplary video sequence generator 150. The video sequence generator 150 may include a controller 220, a database interface 210, an input unit interface 240, a network interface, 250 and a memory 230 connected through bus 200.

Figure 3:
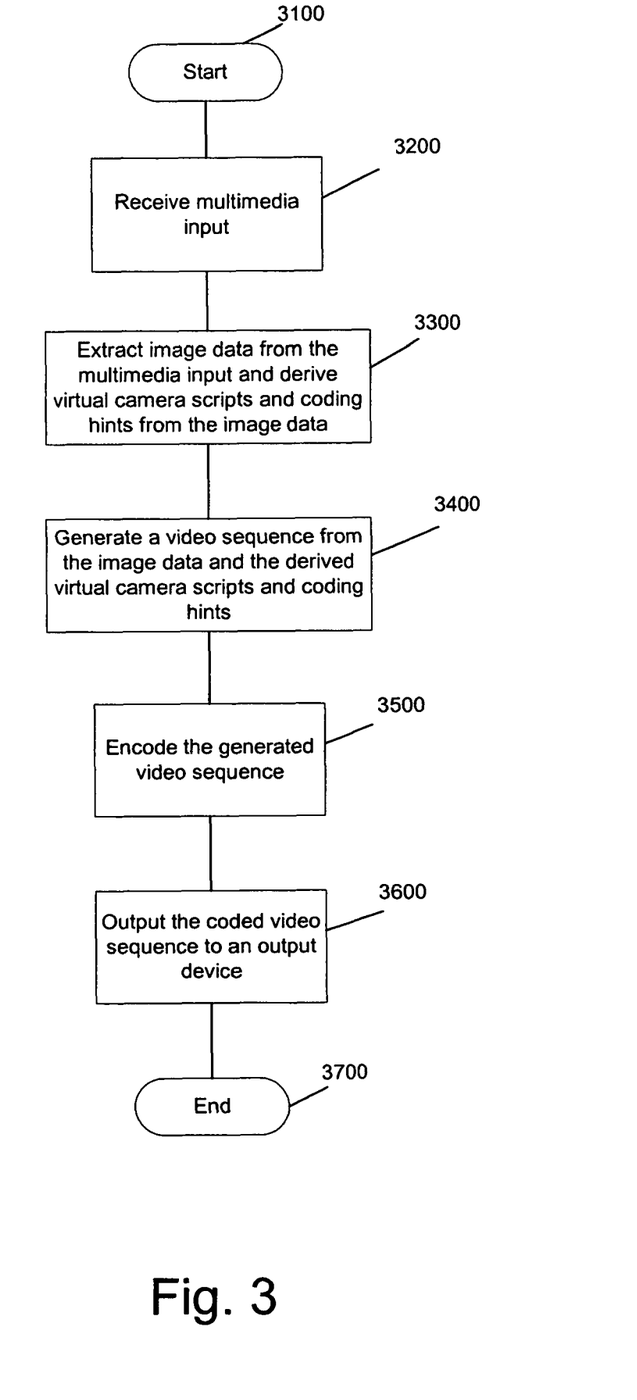
FIG. 3 is a flowchart of an exemplary coded video sequence generating process.

According to the exemplary video sequence generation process shown in FIG. 3, the process begins at step 3100 and proceeds to step 3200 where a multimedia input is received by the input unit 110. At step 3300, the input unit 110 extracts image data, and derives the virtual camera scripts, and coding hints from the image data. In an alternative embodiment, at least one of the virtual camera scripts and coding hints may be derived from the input of a system operator.

The extracted image data and derived virtual camera scripts and coding hints are provided as inputs to the controller 220 of the video sequence generator 150 through the input unit interface 240. The image data (input and/or retrieved from the subscriber database 115), virtual camera scripts, and coding hints may also be input to the video sequence generator 150 from the respective image data, virtual camera scripts, and coding hints databases 120, 130, 140 through the database interface 210. Alternatively, one or more of the image data, virtual camera scripts, and coding hints may be input directly to the video sequence generator 150, or through a communications network (TV, telephone, Internet, etc.) via the network interface 250, and stored in the memory 230. The controller 220 may receive commands from the input unit 110 through the input unit interface 240 and may issue control commands to other components of the system such as the video encoder 160, or to external devices in a network though the network interface 250.

In step 3400, the controller 220 generates the video sequence from the input multimedia using the image data, virtual camera scripts and the coding hints and outputs the generated video sequence to the video encoder 160. In step 3500, the video encoder 160 encodes the generated video sequence based on the derived or generated coding hints and outputs the coded video sequence in step 3600. The process proceeds to step 3700 and ends.

There are many possible scenarios for utilizing the coded video sequence generating system 100. In one possible scenario, a customer contacts a real-estate agent by telephone requesting to visit a house without leaving his or her home. The agent, having an account with a cable provider to host media content, connects the customer to the system through the telephone. Using the telephone keypad, the customer is able to navigate interactively through the different rooms of the house.

In this scenario, a set of photographs has been taken from each room of this house and the resulting media resides at the cable provider's plant. Given the customer's input, the system uses a special plug-in to generate a virtual walk-through. Techniques such as image stitching, warping and projection are used to simulate a real movement of the camera from this set of photographs. Several systems are also commercially available such as Apple QuickTime VR, or IPIX. A series of video frames are thus created 'on-the-fly'. The system then encodes these video frames into coded video data that is then streamed over cable towards the user's TV. For help and guidance purposes, the system may also be able to composite other images over this walk-through video, such as a house plan or navigation instructions.

This type of interactive navigation is also suited for travel agents to reserve hotels, etc. The ability to navigate through an environment, even on a limited basis, provides the customer with a sense of being at the location and therefore, enables him or her to make a more informed better choice.

In another possible scenario, the user converses on the phone with a professional and there is a need for examining a document. The professional is able to use this system to present the document on the user's TV screen. The document can be an X-ray of the user's body, a large street map, a detailed web-page, an aerial picture, a set of vacation pictures, etc. In most cases, the document cannot be presented in its original format on the TV screen and cannot be simply scaled to fit the screen because this would result in an unacceptable loss of resolution. What is needed is a panning of a window over the document as well as the ability to zoom up or down. For multi-page documents there is a further need for skipping pages. The system takes the document image as input as well as the user's input for panning/zooming and generates a series of video frames that simulates this movement. These frames are again coded and streamed over to the user's TV screen.

In another scenario, the composition capabilities of the video encoder 160 can provide synchronized output to multiple end-points. When there are interactive back channels, the composing feature can depict interactions. This feature can allow remote users to see what someone else has done. For example, a picture may depict a set of selections, which a user can point to using a remote control. This pointing action can be depicted as an overlay and retransmitted to other users. If there are data-elements depicted that define interactive controls, e.g., HTML forms, the manipulation of those controls can be depicted as an overlay, and retransmitted as well. If a document camera was the image source, showing a paper document, any computer mouse, PDA input device, or other input device could circle, mark, or annotate the image, as an overlay to be retransmitted in the same manner.

In still yet another scenario, to maintain a passive experience for TV viewers, some information accessed through the Internet can be automatically converted into TV resolutions. Manual scrolling and paging can be replaced by applying algorithms that reformat the static images into a narrative stream. An accompanying audio track can be used, or the document text could be fed through a separate text-to-speech conversion. Using text to speech allows the audio track to automatically be registered with the coded video stills.

These stills could be paged, scrolled, to match the pace at which the audio track was played through the TV set. The encoding service would take care of composing the stills and the audio streams to make the presentation. Other compositional elements could be used, like highlighting words as they are read. In some cases, information gathered about hyperlinks could be used to depict (through animated graphical overlays) something about the destination. This hyperlink depiction can use contents of the destination that are prefetched. The user can simply watch a web-based presentation, or use the remote to move backwards or skip forwards at any time.

As discussed above, in one possible embodiment, the system may be used to provide a service to system subscribers. The subscriber can be a one-time, constant or periodic customer that inputs his or her personal preferences in order to customize the output. The subscriber's preferences may then be stored as a subscriber profile in the subscriber database 115.

Figure 4:
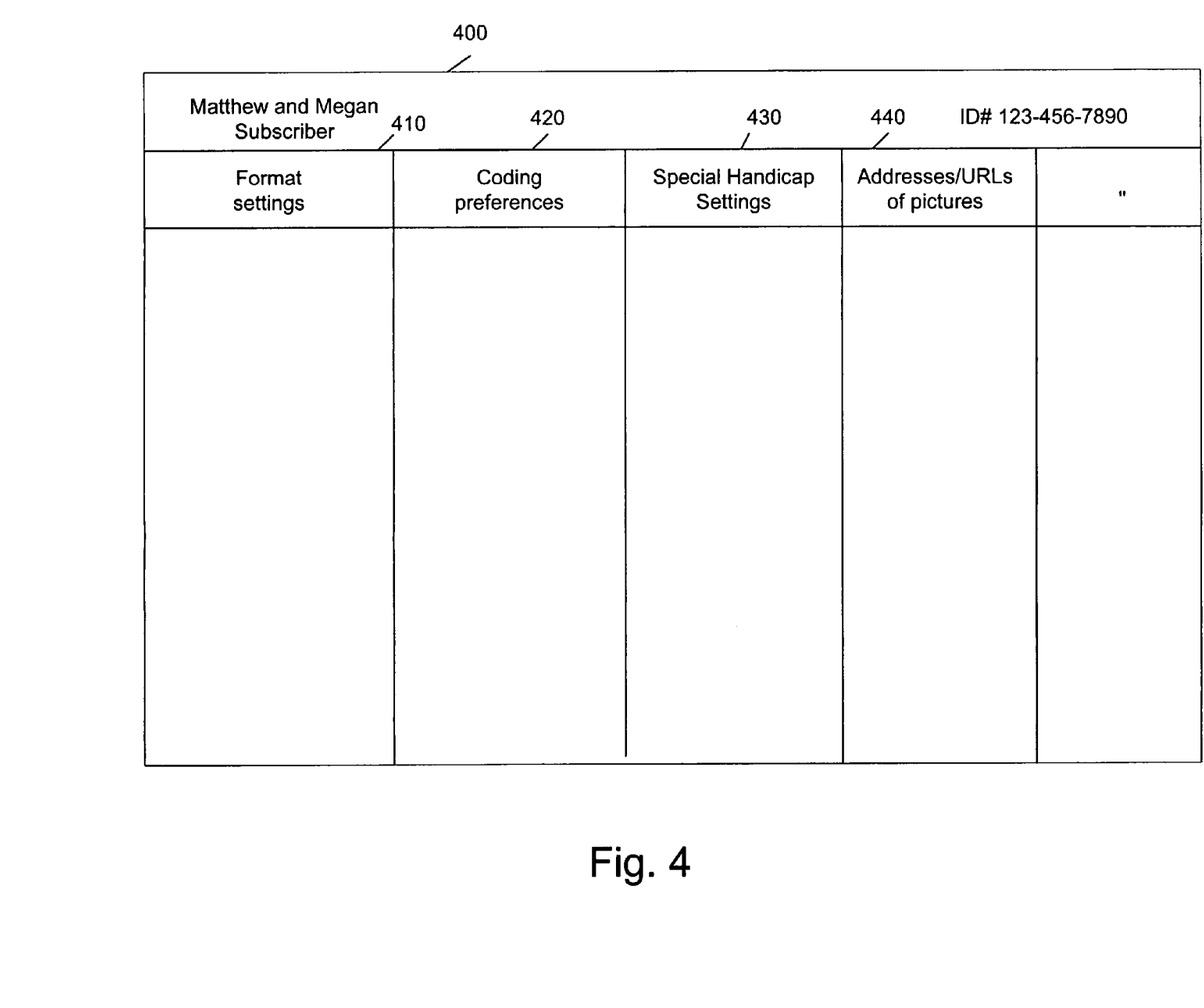
FIG. 4 illustrates an exemplary subscriber profile.

FIG. 4 shows an exemplary subscriber profile 400. The subscriber profile can contain information about the viewing preferences of specific users/subscribers or subscriber households. These preferences may be accessible to the video sequence generator 150 through the input unit as references in the coding hints or the virtual camera scripts, for example.

The subscriber profile 400 may include a variety of preference information, such as preferred format settings 410 that may include the user's preferred text font and size, contrast settings, etc., coding preferences 420 that may include the user's preferred or required audio/video coding specifications, special handicap settings 430 that may include text and audio-coding preferences for subscribers having visual or auditory handicaps, and the address/URL of pictures, video clips, etc. 440 that may include the location of stored images of household members, local points of interest, and local merchants or professionals, which may used as all or part of the coded video sequence. Other categories of subscriber information may also be stored and used by the system, such as billing information, device characteristics (including characteristics of devices used by each household or business member), etc.

The use of the subscriber profile 400 provides the system with a level of flexibility. For example, subtitles or text in an image can be coded differently. Households with no preference would receive default images of text (coded according to algorithms that optimize text appearances). However, households with members who are visually handicapped might receive enlarged high contrast text images. Such images would be easier to read but would consume more screen space than the default text images.

Images of household members, local points of interest, and local merchants or professional can be retrieved from the subscriber database 115, cached in image database 120, and selectively referenced in the virtual camera scripts. The script would specify a variable (e.g., childs_face) whose value is assigned using the profile stored in the subscriber database 115. The value of this variable would specify a specific image or sequence of images in the image database. The use of subscriber images may be useful for a variety of applications, such as inserting an image (or sequence of images) of a realtor in a sequence of images that provide a tour of a house interior, or using the child's face on a well defined screen location in a cartoon, for example.

Initialization and subsequent modification to the subscriber profile 400 through the input unit 110 might occur in several ways. A web-based interface may allow households or customer care agents to set the value of a well-defined list of parameters. The user/subscriber could subscribe to the service on the service provider's Web page, for example. Alternatively, the parameters could be specified through an interactive TV screen, computer display or telephone, etc. The subscriber's input could be accomplished using a variety of known input methods, including interactive voice response (IVR), voice recognition, touch screen or stylus input, touchtone menus (DTMF), through a human customer-care agent, or by any other known input method. In any case, the list of parameters would be defined so that they may be easily referenced by the coding hints and camera scripts. Default settings for each parameter may be specified by the service provider, for example.

Another possible scenario for using the subscriber profile is in the field of advertisement. Advertisements may be stored or referenced so that they may be inserted during multimedia presentations. These advertisements may be targeted to an individual or a group, and may also be personalized. For example, an advertisement may read "Diane Jones, have we got a deal for you!" An advertiser may also be able to place local photos in an ad, such as showing a car on Main St. of the viewer's town, etc. Since the temporal synchronization can be controlled, an image can pop-up in the middle of a commercial and award $100 to the first (or tenth, etc.) person to press "1" on their remote control.

As shown in FIGS. 1 and 2, the method of this invention is preferably implemented on a programmed processor. However, the coded video sequence generating system 100 can also be implemented on a general-purpose or a special purpose computer, a programmed microprocessor or microcontroller, peripheral integrated circuit elements, an application-specific integrated circuit (ASIC) or other integrated circuits, hardware/electronic logic circuits, such as a discrete element circuit, a programmable logic device, such as a PLD, PLA, FPGA, or PAL, or the like. In general, any device on which the finite state machine capable of implementing the flowchart shown in FIG. 3 can be used to implement the coded video sequence generating system 100 functions of this invention.

While the invention has been described with reference to the above embodiments, it is to be understood that these embodiments are purely exemplary in nature. Thus, the invention is not restricted to the particular forms shown in the foregoing embodiments. Various modifications and alterations can be made thereto without departing from the spirit and scope of the invention.

What is claimed is:

1. A method, comprising:
   receiving a plurality of still images, from a subscriber, that includes viewer-specific image data, wherein the plurality of still images are independent of a video sequence;
   extracting image data from the plurality of still images to yield extracted image data;
   deriving a virtual camera script and a coding hint from the extracted image data to yield a derived virtual camera script, wherein the derived virtual camera script comprises a set of image processing instructions that simulates camera movement over portions of the plurality of still images, and wherein the virtual camera script specifies a variable assigned to one piece of the viewer-specific image data;
   taking the extracted image data, the derived virtual camera scripts and the coding hint to yield a generated video sequence;

coding the generated video sequence based on the coding hint to yield a coded video sequence, wherein the coding hint references a coding process and a temporal evolution for each still image of the plurality of still images; and inserting a customized advertisement in the coded video sequence, wherein the customized advertisement includes an offer of an award to a user contingent tied to a user interaction with the customized advertisement.

2. The method of claim 1, further comprising:
receiving preference information from one of the subscriber and a service provider; and
storing the preference information in a subscriber profile, wherein the generated video sequence is based on the subscriber's profile.

3. The method of claim 2, wherein the subscriber's profile includes at least one of format settings, coding preferences, handicap settings, storage addresses of image data, device characteristics, and billing information.

4. The method of claim 3, wherein the format settings include at least one of text font settings, text style settings, and display settings.

5. The method of claim 3, wherein the coding preferences are used as coding hints and include at least one of audio coding preferences and visual coding preferences.

6. The method of claim 3, wherein the handicap settings include at least one of visual enhancement settings and audio enhancement settings.

7. The method of claim 3, wherein the storage addresses of image data include at least one of a computer image file, an image database, a Web page address, a universal resource locator (URL), a floppy disk, and CD ROM.

8. The method of claim 3, further comprising outputting the coded video sequence includes one or more images based on the storage addresses of image data from the subscriber's profile.

9. The method of claim 2, wherein the subscriber's profile includes billing information.

10. The method of claim 2, wherein the subscriber provides multimedia data input and preference information to the input unit using at least one of a touch-tone menu, an interactive voice response system, a voice recognition system, a touch screen, a stylus, a keyboard, a Web page, the Internet, to telephone, a cable TV, a personal computer, and a wireless communication device.

11. The method of claim 2, wherein the subscriber's profile includes information about the display devices owned by the subscriber.

12. The method of claim 11, wherein the coded video sequence is customized for at least one of the devices included in the subscriber's profile.

13. The method of claim 1, further comprising storing the extracted image data in an image data database, the derived virtual camera scripts in a virtual camera scripts database, and the derived coding hints in a coding hints database.

14. The method of claim 1, further comprising receiving at least one input command from a user, wherein at least one of the steps of extracting, deriving, taking and coding are performed based on the at least one input command from the user.

15. The method of claim 1, wherein the image data include image data from at least one of images, pixelmaps, a series of still frames, panorama images, a series of photographs from a film, web-pages, single files containing vector representation of text and graphics, short video clips, single files containing a vector representation of synthetically coded 3D worlds, and lightfields of single objects.

16. The method of claim 1, wherein the virtual camera scripts include at least one of a sliding window of resolution, a document browsing simulation, a general composition of images, synthesized videos from a set of images, a panorama synthesis, and parallax techniques.

17. The method of claim 1, wherein the coding hint comprises at least one of motion information used to generate a sequence of frames, temporal evolution of each frame, and coding parameters for each image.

18. The method of claim 1, wherein the taking step uses a rendering plug-in to decode portions of the image data into pixel maps.

19. The method of claim 1, wherein the taking step uses addresses to generate an image sequence.

20. The method of claim 19, wherein the addresses include URLs.

21. The method of claim 1, wherein the taking step generates the video sequence from more than one multimedia source.

22. The method of claim 21, wherein the multimedia sources include at least one of television, cable TV, interactive TV, Internet, telephone, computer generated images, wireless communications, photographs and electronically stored still images.

23. The method of claim 1, further comprising receiving an audio input corresponding to the generated video sequence.

24. The method of claim 23, further comprising synchronizing the audio input with the generated video sequence.

25. The method of claim 1, further comprising:
receiving audio input from the subscriber, the audio input stored as at least one of a computer file or an address;
storing the subscriber's audio input in the subscriber's profile;
retrieving the subscriber's audio input; and
outputting the subscriber's audio input in conjunction with the generated video sequence.

26. The method of claim 1, wherein the coded video sequence is output using scrolling techniques.

27. The method of claim 1, wherein the inserted customized advertisement is personalized to a user.

* * * * *